(12) United States Patent
Lipiansky et al.

(10) Patent No.: US 8,471,542 B2
(45) Date of Patent: Jun. 25, 2013

(54) ADAPTIVE GATE DRIVE POWER CONTROL SYSTEMS AND METHODS

(75) Inventors: Eduardo M. Lipiansky, Danville, CA (US); Srikanth Lakshmikanthan, Milpitas, CA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 12/783,690

(22) Filed: May 20, 2010

(65) Prior Publication Data
US 2011/0289335 A1    Nov. 24, 2011

(51) Int. Cl.
*G05F 1/00*    (2006.01)
(52) U.S. Cl.
USPC .......................... 323/283; 323/272; 323/285
(58) Field of Classification Search
USPC ............. 323/241, 272, 282, 283, 285; 363/22
See application file for complete search history.

(56) References Cited

U.S. PATENT DOCUMENTS

| | | | |
|---|---|---|---|
| 6,768,295 B2 | 7/2004 | Santin et al. | |
| 6,771,052 B2 * | 8/2004 | Ostojic | 323/266 |
| 6,781,354 B2 | 8/2004 | Zhang | |
| 6,954,054 B2 * | 10/2005 | Brown | 323/283 |
| 7,054,170 B2 | 5/2006 | Yang et al. | |
| 7,173,400 B2 * | 2/2007 | Morioka | 323/266 |
| 7,327,129 B2 | 2/2008 | Chen et al. | |
| 7,580,805 B2 * | 8/2009 | Tabaian et al. | 702/106 |
| 7,741,983 B1 | 6/2010 | Lakshmikanthan et al. | |
| 7,969,129 B2 * | 6/2011 | Kudo | 323/266 |
| 7,986,254 B1 | 7/2011 | Lakshmikanthan et al. | |
| 2004/0076024 A1 * | 4/2004 | Liu et al. | 363/41 |
| 2005/0184713 A1 * | 8/2005 | Xu et al. | 323/282 |
| 2007/0262756 A1 | 11/2007 | Valley et al. | |
| 2008/0310200 A1 * | 12/2008 | Maksimovic et al. | 363/65 |
| 2009/0224731 A1 | 9/2009 | Tang et al. | |

FOREIGN PATENT DOCUMENTS
WO    2006122235    11/2006

OTHER PUBLICATIONS

International Search Report and Written Opinion, PCT/US2011/036954, date of mailing Dec. 23, 2011.
Zhang et al., "Online Calibration of Mosfet On-State Resistance for Precise Current Sensing," IEEE Power Electronics Letter, vol. 2, No. 3, Sep. 2004, pp. 100-103.
Lenk, "Application Bulletin AB-20, Optimum Current Sensing Techniques in CPU Converters," Jan. 20, 1999, 4 pages, www.fairchildsemi.com.
Dong et al., "DCR Current Sensing Method for Achieving Adaptive Voltage Positioning (AVP) in Voltage Regulators with Coupled Inductors," The Bradley Department of Electrical and Computer Engineering, Virginia Polytechnic Institute and State university, before the date of this instant application, 7 pages.
Nagaraja et al.,"Design and Analysis of Four-Phase Synchronous Buck Converter for VRM Applications," Indian Institute of Technology, Kharagpur, 721302, Dec. 20-22, 2004, pp. 575-580.
RichTek, "VRM 8.5 Synchronous PWM Buck Converter Controller and Output Voltage Monitor," Mar. 2004, 8 pages.
AN2239 Application Note, "Maximizing Synchronous Buck Converter Efficiency with Standard STripFETsä with Integrated Schottky diodes," Oct. 2005, 14 pages.

* cited by examiner

*Primary Examiner* — Adolf Berhane
*Assistant Examiner* — Gary Nash
(74) *Attorney, Agent, or Firm* — Lerner, David, Littenberg, Krumholz & Mentlik, LLP (57) ABSTRACT

Aspects of the invention pertain to optimization of multiphase voltage converter efficiency regardless of load conditions. A processor is coupled to different stages of a power control system. Input and output voltages to the different stages are monitored and varied by the processor. The processor is also configured to activate or deactivate different phases of the voltage converter in accordance with load current conditions.

12 Claims, 7 Drawing Sheets

ADAPTIVE GATE DRIVE POWER CONTROL SYSTEMS AND METHODS

CROSS-REFERENCE TO RELATED APPLICATION

The present application is related to co-pending U.S. patent application Ser. No. 12/315,655, entitled "Auto-Measurement and Calibration of DC Resistance in Current Sensing Applications, filed Dec. 5, 2008, the entire disclosure of which is hereby incorporated by reference.

BACKGROUND OF THE INVENTION

1. Field of the Invention

Aspects of the invention relate generally to power conversion applications. More particularly, aspects are directed to optimization of multi-phase voltage conversion applications.

2. Description of Related Art

Power conversion equipment is used to provide regulated power and a specified load current to a wide variety of devices, including microprocessors used in computers.

In many computer server systems, at least two power conversion stages are cascaded from the initial power source (e.g., wall supply) to the power consuming loads such as individual processing elements. Each power conversion stage has its own efficiency. The larger the number of stages that are cascaded, the lower the overall converter efficiency will be. In other words, each added power conversion stage reduces the overall end-to-end efficiency.

Nonetheless, more than one power conversion stage is often needed. This is because the input voltages from the initial power source may be quite high, e.g., hundreds of volts (AC), and the (DC) output voltages supplied to (consumed) a given load may be 1-5 volts or even a fraction of a volt. Typically, one stage alone cannot provide an implementation with and end-to-end power conversion efficiency greater than 80%. Thus, individual stages with higher efficiencies are employed.

Furthermore, computer server architecture power converter implementations may be designed for a single point of operation, such as one load current, a fixed number of phases, fixed duty cycles of first and second stages, and fixed gate drive voltages. For example, a design may have 85% efficiency at full load, but the efficiency may be substantially less for other load conditions.

SUMMARY OF THE INVENTION

Systems and methods are provided herein that adapt to changing load conditions to achieve high end-to-end power converter efficiency.

According to one embodiment, a power control system comprises first and second stage voltage converters and a processor. The first stage voltage converter is adapted to receive an input voltage having a first value and to output a second voltage having a second value. The second stage voltage converter is adapted to receive the second voltage output from the first stage voltage converter and to output a third voltage having a third value for use by a load device. The second stage voltage converter includes a plurality of phases. The processor is configured to receive operational information from the first and second voltage converters and to dynamically vary at least one of the second voltage output by the first stage voltage converter, a drive voltage of the second stage voltage converter, and a number of active phases of the second stage voltage converter.

In one example, the processor is configured to select the number of active phases based upon a load current for the load device. Here, the processor is optionally configured to vary at least one of the second voltage and the drive voltage upon selection of the number of active phases.

In another example, the power control system further comprises a sensor coupled to the first and second stage voltage converters and the processor. The sensor is configured to receive an input power value of the first stage voltage converter, an output power value of the first stage voltage converter, an output power value of the second stage voltage converter, and temperature information for the second stage voltage converter. The sensor is further configured to provide information received from the first and second stage voltage converters to the processor.

In an alternative, the first and second stage voltage converters are DC to DC converters. In another alternative, the load device is an external processor and the processor of the power control system is configured to vary the second voltage between 6 volts and 12 volts and to vary the drive voltage between 5 volts and 12 volts. In a further alternative, the first stage voltage converter is an AC to DC converter and the second stage voltage converter is a DC to DC converter.

According to another embodiment, a power control apparatus comprises first and second stage voltage converter means. The first stage voltage converter means is for receiving an input voltage having a first value and for outputting a second voltage having a second value. The second stage voltage converter means is for receiving the second voltage output from the first stage voltage converter and for outputting a third voltage having a third value for use by a load device. The power control apparatus also includes processor means for changing at least one of the output second voltage and the output third voltage up or down to maintain an operating voltage at the load device within a predetermined regulation level and to re-distribute losses among the first and second voltage converter means.

In one example, the processor means is operable to vary a number of active phases of the second stage voltage converter means. In another example, the processor means is operable to change the output second and third voltages to maximize power converter efficiencies of the first and second stage voltage converter means. In this case, maximization of the power converter efficiencies is desirably performed by maximizing a product of the power converter efficiencies.

In a further example, the power control apparatus also comprises sensing means for receiving power values and temperature information for at least one of the first and second stage voltage converter means. In this case, the processor means is operable to change the output second voltage and the output third voltage in response to the received power values and temperature information.

In accordance with another embodiment, a power control method comprises receiving an input voltage having a first value at a first voltage converter; the first voltage converter converting the input voltage to a second voltage having a second value; a second voltage converter converting the second voltage to a third voltage having a third value; receiving operational information from the first and second voltage converters; and dynamically varying at least one of the second voltage, a drive voltage of the second voltage converter, and a number of active phases of the second voltage converter to maintain an operating voltage of a load device within a predetermined regulation level.

In one alternative, the method further comprises selecting the number of active phases based upon a load current of the load device. In another alternative, the method further comprises varying at least one of the second voltage and the drive voltage upon the selection of the number of active phases.

And in yet another embodiment, a system is provided which comprises a load device including a central processing unit, first and second stage voltage converters, and processor means. The first stage voltage converter is adapted to receive an input voltage having a first value and to output a second voltage having a second value. The second stage voltage converter is adapted to receive the second voltage output from the first stage voltage converter and to output a third voltage having a third value for use by the load device. Here, the second stage voltage converter including a plurality of phases. The processor means is for receiving operational information from the first and second voltage converters and for dynamically varying at least one of the second voltage output by the first stage voltage converter, a drive voltage of the second stage voltage converter, and a number of active phases of the second stage voltage converter.

In one example, the processor means is operable to select the number of active phases based upon a load current for the load device. And in another example, the processor means is operable to maintain an operating voltage at the load device within a predetermined regulation level.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Figure 1:
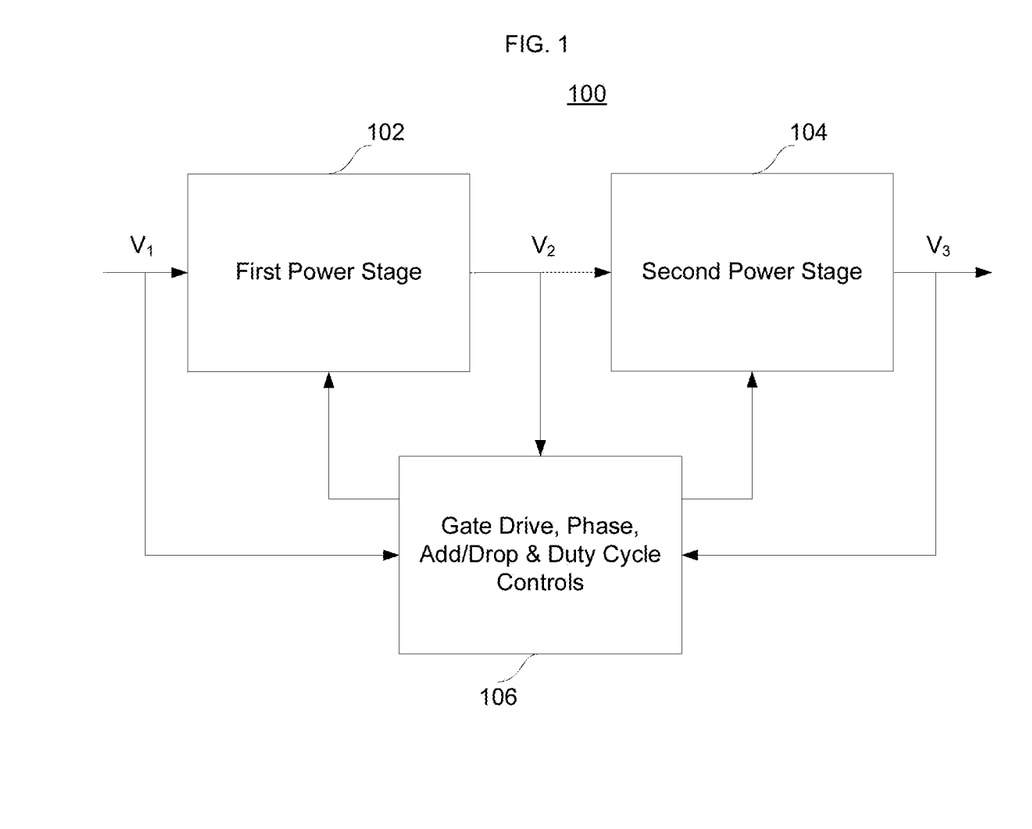
FIG. 1 is a block diagram of a multi-phase system architecture in accordance with aspects of the invention.

FIG. 1 illustrates a system block diagram for a power conversion system 100. As shown, the system 100 includes a first power stage 102, a second power stage 104 and a control apparatus 106. The power stages 102 and 104 provide a dual-stage DC-to-DC power converter.

When the first stage 102 receives a voltage V1 and steps it down to V2 (the first stage output), stage 2 receives as input the output of stage 1 and steps it down to V3. Note that V1 is the overall input to the two cascaded power conversion stages and V3 is the overall output. In this context V1 is usually a much larger voltage than V2, and V2 is usually a larger voltage than V3.

Herein, V1 is referred to as the overall input voltage and V3 is referred to as the voltage at the load. V2 is an intermediate voltage used by the inputs of second stage converter 104. In the present example, both stages 102 and 104 receive DC inputs and generate DC outputs. Without loss of generality, aspects of the invention herein are also applicable to an AC-to-DC stage followed by one or more DC-to-DC stages. Each of the stages may have one or more phases to handle the desired output current level. Furthermore, power conversion according to aspects of the invention is not limited to be used on a computer server; it can be employed with a large variety of electronic equipment and products that use a switching power conversion scheme.

Figure 2A:
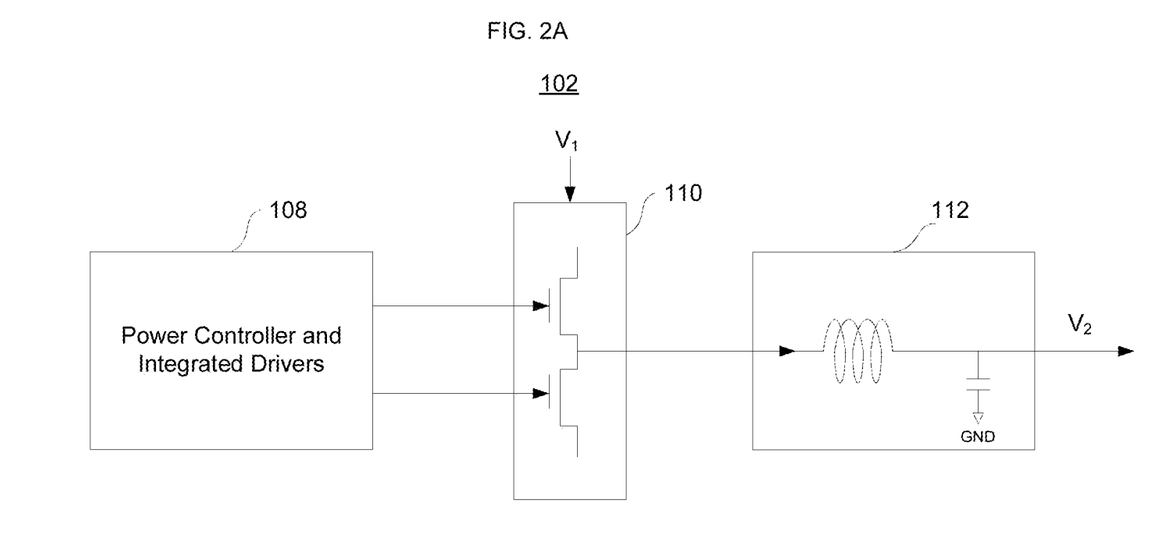
FIGS. 2A-B illustrate aspects of the multi-phase system of FIG. 1

An exemplary first power stage 102 is shown in more detail in FIG. 2A. In this example, the first power stage 102 includes a power control section 108, a power train 110 and an output section 112. The power control section 108 may include different input and output signals such as voltage regulator module controls, fault indicators, and pulse width modulation input for varying the output of the first stage. As shown, the power train 110 desirably includes a pair of transistors which receive input from the power control section 108 and outputs a signal to the output section 112 having an inductor therein. In this example, the output section 112 provides a single phase output, although multiple phases are possible.

Figure 2B:
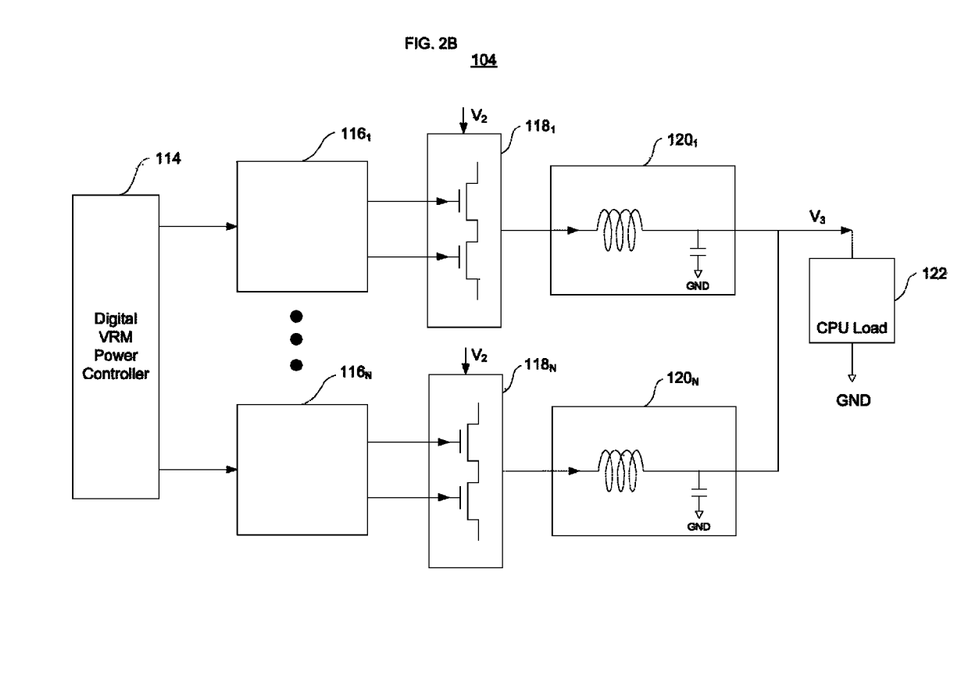

FIG. 2B illustrates an exemplary multi-phase second power stage 104. In this example, a voltage regulator module 114 controls N drivers 116, one for each phase of the second power stage 105. Each driver provides input into a respective portion of second stage power train 118. The output from the power train 118 is received by a given phase 120, each of which desirably includes at least one inductor. The collective output from the phases 120 is $V_3$ of FIG. 1, which is then provided to a load such as a CPU 122.

Step-down converters, such as those shown in FIGS. 1-2, inherently have losses. It has not been physically possible yet to construct a step-down converter with a maximum efficiency of 100%. This is because the electrical and electronic components that comprise a converter are not lossless devices. For example, power transistors use switching elements. And inductors, capacitors, diodes and gate drivers all inherently have losses. As an exemplary case a single-phase or a multiphase step-down converter implemented as generally shown in FIG. 1 will include the following losses:
1. Top and bottom MOSFET transistors: Conduction losses
2. Top and bottom MOSFET transistors: Switching losses
3. Top and bottom MOSFET transistors: Gate driver losses
4. Inductor: copper (metal) losses
5. Inductor: core losses
6. Capacitors: Equivalent series resistor (ESR) losses
7. Diodes: Body diodes reverse recovery losses The latter three types of losses may be omitted in loss calculations. For instance, core losses on inductors may be considered negligible for analysis purposes. This is an acceptable approximation for a correctly sized inductor operating below its core saturation limit. Capacitor ESR may also be ignored for the purpose of efficiency calculations. This is acceptable for a well designed converter where the ripple current is very small compared to the output DC current through the load; thus, the power losses for capacitor ESR may be ignored. Diode recovery losses may also be ignored for being smaller than the other losses combined.

Conduction losses are primarily due to the ON drain-to-source resistance ($R_{DS(on)}$) of the MOSFETs in the step-down converter. Conduction losses are respectively for each MOSFET:

$$P_{conduction-loss} = D * R_{DS(on)} * I_{RMS}^2 \quad \text{(Eq. 1)}$$

for the top MOSFET, where D is the duty cycle and for a buck converter that equals $V_{out}/V_{in}$.

$$P_{conduction-loss} = (1-D) * R_{DS(on)} * I_{RMS}^2 \quad \text{(Eq. 2)}$$

for the bottom MOSFET where D is again the converter duty cycle. $I_{RMS}$ is the root-mean-square current flowing through the inductor. Since both MOSFETs are effectively turned on 100% of the time, ignoring dead-conduction times, both MOSFETs present a total conduction loss given by the following equation.

$$P_{conduction-loss} = R_{DS(on)} * I_{RMS}^2 \quad (Eq. 3)$$

(both by the current conduction of both MOSFETs)

In equation 3, the RMS current through the MOSFET is given by the following equation:

$$I_{RMS} = I_{OUT} \sqrt{[D*(1+r^2/12)]} \quad (Eq. 4)$$

Here, r represents the inductor current ripple ratio and it is defined by the inductor peak-to-peak current in relation to the inductor DC current according to the following equation.

$$r = I_{pk-pk} / I_{DC} \quad (Eq. 5)$$

Figure 3:
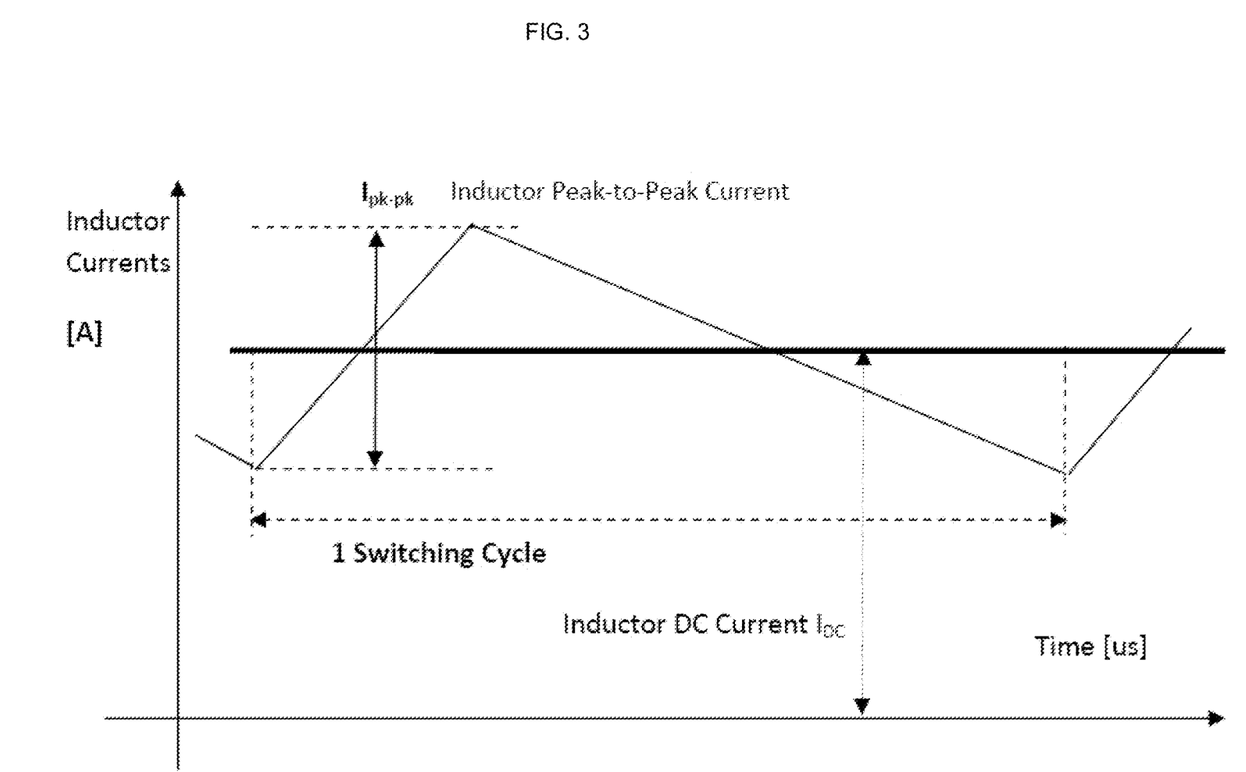
FIG. 3 illustrates features of the system of FIG. 1 in accordance with aspects of the invention.

FIG. 3 illustrates inductor peak-to-peak current $I_{pk-pk}$ and DC current $I_{DC}$ in relation to one switching cycle.

For a power conversion architecture such as a buck converter, the switching loss is approximately equal to the following:

$$P_{switching\_loss} \approx V_{in} * I_{out} * t_{cross} * f_{sw} \quad (Eq. 6)$$

Here, $V_{in}$ is the converter input voltage, $I_{out}$ is the converter DC output current, $t_{cross}$ is the switching loss due to non-zero crossover of drain current and drain-to-source transistor voltage for both turn-off and turn-on times, and $f_{sw}$ is the converter switching frequency.

The power required to charge the gate of each MOSFET is given according to the following equation:

$$P_{GATE} = Q_G * V_{DD} * f_{sw} \quad (Eq. 7)$$

where QG is the charge required by the gate capacitances.

And the non-zero resistance of the inductor winding, also referred to as DCR, causes a loss equal to:

$$P_{Ind-Copper-Loss} = I_{RMS}^2 * R_L \quad (Eq. 8)$$

where $R_L$ is the DC resistance of the inductor.

An analysis of the overall effect of the losses on the cascaded multi-stage system identifies the following points.

When the duty cycle is less than 50%, one of the MOSFETS dominates the conduction losses while the other dominates the switching losses. The smaller the duty cycle, the more pronounced this effect is. In particular, the smaller the duty cycle for a buck converter, the more the conduction losses dominate the losses of the a first one of the MOSFETs, while the more the switching losses dominate the other one of the MOSFETs.

Increasing the duty cycle has the effect of redistributing losses among top and bottom MOSFETs. Increasing the gate drive voltage has the effect of reducing the MOSFET $R_{DS(on)}$ when high levels of current flow through the transistor. At the same time the gate driver losses increase.

Decreasing the gate voltage drive has the effect of reducing the gate driver loss. When the MOSFET runs at very low levels of its maximum drain current the conduction loss due to the somewhat increased MOSFET $R_{DS(on)}$ may be smaller than the reduced gate voltage drive loss.

In multiphase converters, multiple phases are used to handle the total load current that each top and bottom transistor pairs per phase would not be able to handle otherwise.

In one example, a six-phase converter is provided. In this case, the converter may deliver 1 volt output and 180 amp load current. When the full load current of 180 A is being drawn by the load it is preferable to enable all six phases. This assumes that each phase can handle a pro-rata share of the current, namely 30 A. However, when the load current is smaller, for example 50A for a relatively long period of time (e.g., milliseconds), it may be more beneficial to drop from six phases down to two phases. This is because two phases is capable of handling up to 60 A of current. By dropping or otherwise turning off the other four phases and employing a power converter controller that has a fixed scheduling of the sequencing of its phases, conduction, switching and gate drive losses may be significantly reduced. However, this is at the expense of increasing the ripple current to some extent.

In one alternative, the power converter controller may not have a fixed phase scheduler. In this case, upon phase dropping the remaining of the phases in use operate over the same switching period. Here, only the switching and gate drive losses may be reduced as the conduction losses would again be redistributed (or picked up) by the remaining phases.

Changing the output voltage of the first stage and the second stage up or down, so that the overall output voltage at the load is maintained within its regulation levels, allows the means to re-distribute the losses among both power conversion stages and its driver stage. This allows maximizing the overall end-to-end efficiency.

Figure 4:
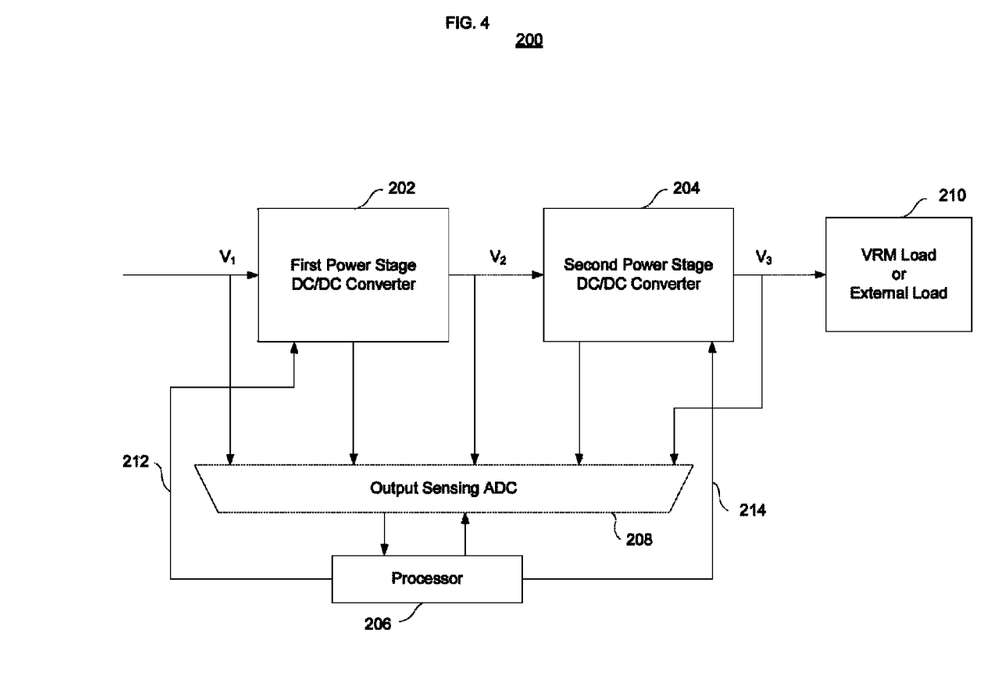
FIG. 4 illustrates a system architecture in accordance with aspects of the invention.

In view of the above and in accordance with aspects of the invention, a microcontroller or microprocessor-based control system is employed to dynamically optimize the efficiency of the (DC-to-DC) converters in the cascaded power stages. FIG. 4 illustrates an architecture 200 for dynamic optimization. As shown, the architecture 200 includes a first stage converter 202 and a second stage converter 204, both of which may be DC-to-DC converters.

The architecture 200 also includes a processor 206, which may be a microcontroller or microprocessor. The processor 206 receives sensed outputs from the converters 202 and 204 via sensor 208. The processor 206 also provides control inputs to the converter stages 202 and 204, as well as the sensor 208. The processor 206 may be implemented as a PIC-32 microcontroller, although other microcontrollers or ASICs may be employed.

The sensor 208 may comprise an output sensing analog to digital converter (ADC). The architecture 200 may also include a voltage regulator module (VRM) load or external load 210. As shown, input voltage $V_1$ is provided to the first converter stage 202, which outputs voltage $V_2$. This voltage is provided to the second stage 204, which outputs voltage $V_3$. This voltage may be passed on to a subsequent converter stage (not shown) or to the load 210.

Input control variables of the architecture 200 include the first stage output voltage $V_2$, which is also the second stage input voltage, the gate driver voltage levels of the first and second stages 202 and 204, and the number of active phases of the converter. Examples of the sensed outputs received by the sensor 208 and provided to the processor 206 include the first stage input power (input current and input voltage), the first stage output power (first stage output current and output voltage), the second stage output power (second stage output current (the load current) and the load voltage), and power train transistors and inductor temperature sensing for calibration and enhancement of current measurements accuracy.

The processor 206 controls the first and second stage controllers based upon this information via control lines 212 and 214, respectively. Desirably, the processor 206 performs open loop control for optimal efficiency using the control variables.

Figure 5A:
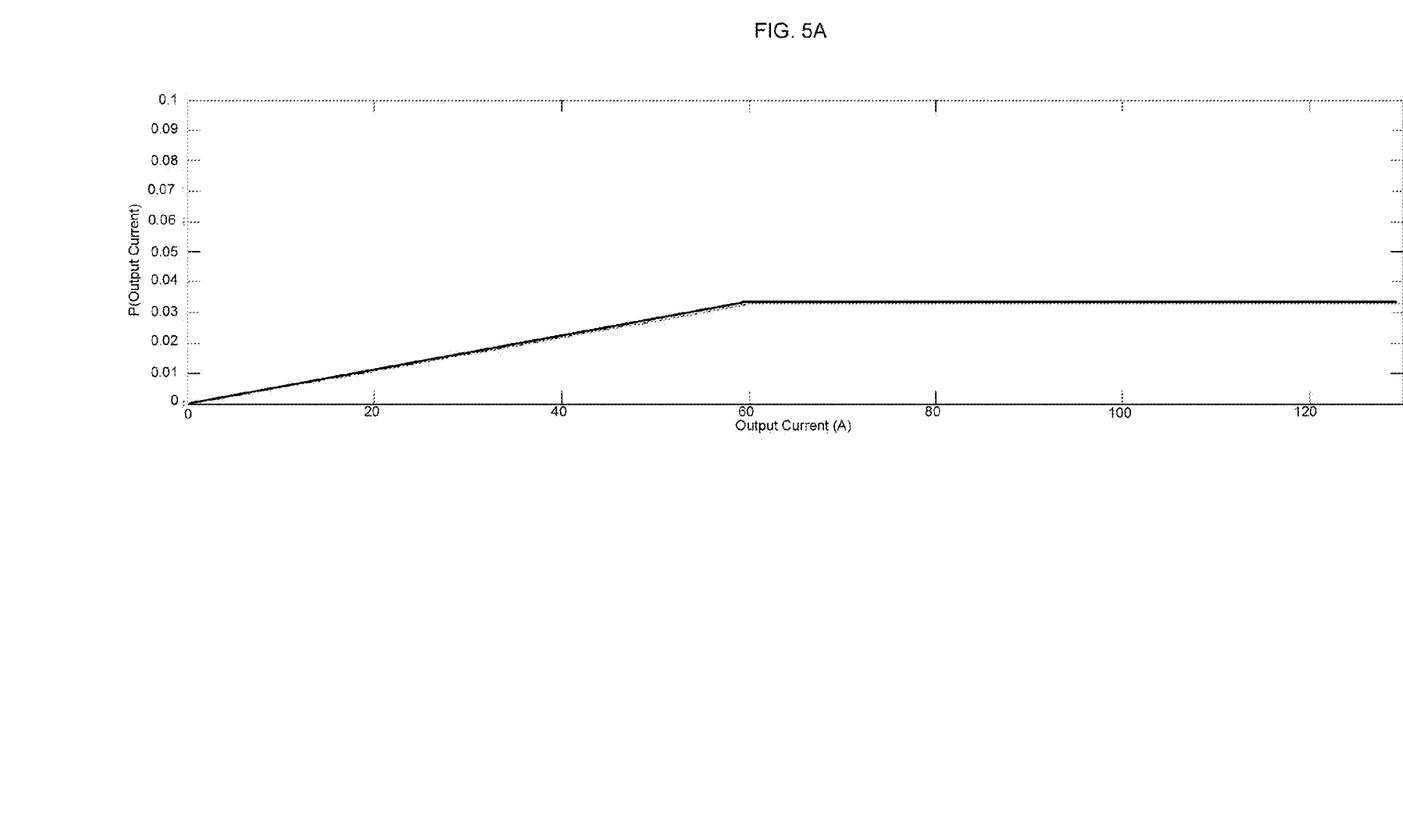
FIGS. 5A-B are plots illustrating power consumption and power savings in accordance with aspects of the invention.
Figure 5B:
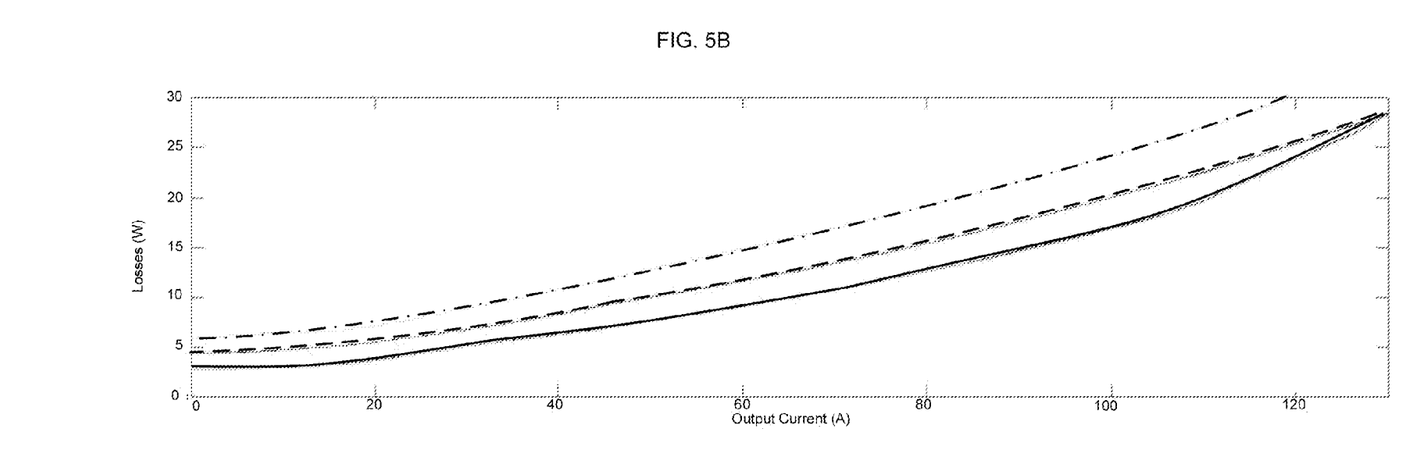

FIGS. 5A and 5B illustrate power and losses in an exemplary case for a two-stage power conversion system such as shown in FIGS. 1, 2 and 4. FIG. 5A shows current consumption by the load (e.g., a CPU). In this example, the power is shown rising until an output current of 60 amps is reached. After this point, the power remains approximately constant.

FIG. 5B illustrates power losses with and without management by a processor for one example. The topmost curve represents losses when there is no control on input voltage to the DC/DC regulator (12V) and no gate driver control either; in other words, both the input voltage (12V) and the driver voltage are fixed (12V). The topmost curve may be considered a worst-case scenario with maximum losses. The middle curve shows results where the input voltage to the second stage (DC/DC) converter is at 9.5V, the input voltage is fixed, and the gate drive voltage to the second stage converter is variable from, e.g., 5-12V. In the lowermost curve, there is a variable input voltage to the second stage DC/DC converter and variable gate drive voltage to this stage on the order of, e.g., 6-7V.

As can be seen, there is approximately a 5 watt reduction in losses from the topmost curve to the lowermost curve. This presents an overall improvement of approximately 5% from mid-range output currents (e.g., 60 A) to a full load current (e.g., 120 A).

In accordance with one aspect of the invention, selected system parameters are managed by a processor to improve the overall end-to-end efficiency of a multistage power conversion system as discussed herein. In the architecture shown in FIG. 4, the processor 206 manages the output voltage ($V_2$) of the first stage converter 202, the number of phases in operation for the second stage converter 204, and the second stage power train gate drive voltage.

In one example, the first stage output voltage is programmatically variable and is managed by the processor 206. Here, the first stage output voltage may vary to account for losses according to the duty cycle of the converter.

In another example, the second stage converter has N total phases, where N is greater than 1. In one case there may be 6 total phases, although the exact number of total phases may vary depending upon design considerations. Thus, in other examples, 2, 4, 7, 9, 12 or more total phases may be employed. Any number of phases may be on or off based upon load conditions. In one alternative, each phase is designed to conduct a maximum of 20 A. Thus, in the case where there is a total current of 120 A, six phases are provided. In other alternatives, different current limits (e.g., 10 A, 15 A, 30 A, 40 A, etc) may be employed for each phase. A different total current greater than or less than 120 A may also be employed.

In the above example, conduction and switching losses proportionally scale with the load from 120 A down to 20 A. However, gate driver losses proportionally increase with the number of active phases. As used here, an active phase refers to a phase that has been enabled, for instance by the processor. An inactive phase refers to a disabled phase, which may have been disabled by the processor. A disabled phase will not conduct any portion of the output current and it will not significantly take gate driver power. Thus, enabling and disabling the number of phases of the second power conversion stage enables the system to control the gate driver losses when current demands are low. For example, if it is desirable to save gate driver losses at 20 A, only one phase need be activated. For 60 A, only three phases need be activated, and so on.

Driver voltages for systems using power MOSFETs may be 5V up to 11 or 12V. When load currents are high (e.g., close to 120 A) it is beneficial to strongly turn on the MOSFET. To do that, a high gate voltage such as 11V may provide a good efficiency. Turning the MOSFET ON strongly (for example by applying a gate voltage on the order of 12V) minimizes the conduction losses through it at the expense of a somewhat increased gate drive voltage loss. However, at very low levels of output current (or power) there is no need to drive the gate voltage that high. Voltages of 5V or 6V produce sufficiently low values of $R_{DSon}$ and reduce the amount of gate drive power that the MOSFETs of the converter stages take.

Desirably, for current load variations and first stage input voltage variations, the first and second stage power converter efficiencies should be maximized. In particular, the efficiencies for each stage may be maximized individually; however, it is more preferable to maximize the product of the efficiencies. This may be done by optimizing the variable gate drive voltage, the first stage output voltage and phase enablement/disablement. Inductor calibration and input and output power calculations may also be factored into the analysis.

The following table illustrates different parameters which may be managed by the system processor to ensure maximum power conversion efficiency.

| $1^{st}$ Stage Output Voltage (V) | $2^{nd}$ Stage Drive Voltage (V) | $2^{nd}$ Stage # of Phases | Load Current (Amps) |
| --- | --- | --- | --- |
| 6 | 5 to 12 | 1 to 6 | 10 to 150 |
| 7 | 5 to 12 | 1 to 6 | 10 to 150 |
| 8 | 5 to 12 | 1 to 6 | 10 to 150 |
| 9 | 5 to 12 | 1 to 6 | 10 to 150 |
| 10 | 5 to 12 | 1 to 6 | 10 to 150 |
| 11 | 5 to 12 | 1 to 6 | 10 to 150 |
| 12 | 5 to 12 | 1 to 6 | 10 to 150 |

As shown in this example, the output voltage of the first stage converter may range between 6 to 12 volts. The drive voltage of the second stage converter ranges between to 12 volts. In this case, up to 6 phases in the second stage may be employed, and the load current output from the second stage may be between 10 and 150 amps. In one scenario, the voltages may be varied in steps of 1 volt, although other increments (e.g., 0.1V, 0.25V, 2V, etc.) may be employed. The number of active phases is desirably increased in increments of 1. And the load current may be varied in steps of 10 amps, although other increments (e.g., 0.1 A, 1.0 A, 2.5 A, 25 A, etc.) may be employed.

The processor is configured to vary any of the parameters in the above table. For instance, depending upon the load current required, the processor may select a number of phases in the second stage converter to make active. In one configuration, the number of phases may be selected according to the following table.

| Current Range (A) | Number of Phases |
| --- | --- |
| 0-24.99 | 1 |
| 25-49.99 | 2 |
| 50-74.99 | 3 |
| 75-99.99 | 4 |
| 100-124.99 | 5 |
| 125-150 | 6 |

The processor is also configured to vary the output voltage of the first stage and the drive voltage of the second stage in accordance with the number of phases selected to provide the desired output current, for instance to minimize the losses.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A power control system, comprising:
a first stage voltage converter adapted to receive an input voltage having a first value and to output a second voltage having a second value;
a second stage voltage converter adapted to receive the second voltage output from the first stage voltage converter and to output a third voltage having a third value for use by a load device, the second stage voltage converter including a plurality of phases;
a processor configured to receive operational information from the first and second voltage converters and to dynamically vary each of the second voltage output by the first stage voltage converter, a drive voltage of the second stage voltage converter, and a number of active phases of the second stage voltage converter; and
a sensor coupled to the first and second stage voltage converters and the processor, the sensor being configured to receive an input power value of the first stage voltage converter, an output power value of the first stage voltage converter, an output power value of the second stage voltage converter, and temperature information for the second stage voltage converter, the sensor being further configured to provide information received from the first and second stage voltage converters to the processor, wherein the processor is configured to perform open loop control on the first and second stage voltage converters.

2. The power control system of claim 1, wherein the processor is configured to select the number of active phases based upon a load current for the load device.

3. The power control system of claim 2, wherein the processor is further configured to vary at least one of the second voltage and the drive voltage upon selection of the number of active phases.

4. The power control system of claim 1, wherein the first and second stage voltage converters are DC to DC converters.

5. The power control system of claim 1, wherein the load device is an external processor and the processor of the power control system is configured to vary the second voltage between 6 volts and 12 volts and to vary the drive voltage between 5 volts and 12 volts.

6. The power control system of claim 1, wherein the first stage voltage converter is an AC to DC converter and the second stage voltage converter is a DC to DC converter.

7. The system of claim 1, wherein the temperature information received by the sensor includes inductor temperature information for calibration and enhancement of current measurement accuracy.

8. A power control apparatus, comprising:
first stage voltage converter means for receiving an input voltage having a first value and for outputting a second voltage having a second value;
second stage voltage converter means for receiving the second voltage output from the first stage voltage converter means and for outputting a third voltage having a third value for use by a load device;
means for changing each of the output second voltage and the output third voltage up or down to maintain an operating voltage at the load device within a predetermined regulation level and to re-distribute losses among the first and second voltage converter means;
sensing means for receiving power values and temperature information for at least one of the first and second stage voltage converter means, wherein the means for changing is operable to change the output second voltage and the output third voltage in response to the received power values and temperature information.

9. The power control apparatus of claim 8, wherein the means for changing is operable to vary a number of active phases of the second stage voltage converter means.

10. The power control apparatus of claim 8, wherein the means for changing is operable to change the output second and third voltages to maximize power converter efficiencies of the first and second stage voltage converter means.

11. The power control apparatus of claim 10, wherein maximization of the power converter efficiencies is performed by maximizing a product of the power converter efficiencies.

12. The apparatus of claim 8, wherein the temperature information received by the sensing means includes inductor temperature information for calibration and enhancement of current measurement accuracy.

* * * * *